US012363082B2

(12) United States Patent
Sharma et al.

(10) Patent No.: US 12,363,082 B2
(45) Date of Patent: Jul. 15, 2025

(54) HIGH BANDWIDTH ENCRYPTION ENGINES IN A MULTIPATHING IP NETWORK

(71) Applicant: Cisco Technology, Inc., San Jose, CA (US)

(72) Inventors: Govind Prasad Sharma, Union City, CA (US); Prabhu Balakannan, Milpitas, CA (US); Sivakumar Kailas, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 280 days.

(21) Appl. No.: 18/147,369

(22) Filed: Dec. 28, 2022

(65) Prior Publication Data

US 2024/0223544 A1 Jul. 4, 2024

(51) Int. Cl.
*H04L 29/06* (2006.01)
*H04L 9/40* (2022.01)
*H04L 12/46* (2006.01)

(52) U.S. Cl.
CPC ...... *H04L 63/0478* (2013.01); *H04L 12/4633* (2013.01)

(58) Field of Classification Search
CPC ............. H04L 63/0478; H04L 12/4633; H04L 12/4604; H04L 2012/4629; H04L 9/0861; H04L 63/0272; H04L 63/06; H04L 63/123; H04L 63/0428
See application file for complete search history.

(56) References Cited

U.S. PATENT DOCUMENTS

| 6,975,626 | B1 * | 12/2005 | Eberle | ..................... H04L 47/32 370/466 |
| 7,061,929 | B1 * | 6/2006 | Eberle | ................... H04L 47/125 370/423 |
| 7,065,580 | B1 * | 6/2006 | Eberle | ................. H04L 49/3063 370/461 |
| 10,778,662 | B2 | 9/2020 | Sharma et al. | |

(Continued)

OTHER PUBLICATIONS

Cisco.com, "Cloudsec Encryption", available at <<https://www.cisco.com/c/en/us/td/docs/dcn/mso/3x/configuration/cisco-aci-multi-site-configuration-guide-301/aci-multi-site-cloudsec.html>>, Apr. 12, 2021, 16 pages.

(Continued)

*Primary Examiner* — Mahfuzur Rahman
(74) *Attorney, Agent, or Firm* — Lee & Hayes, P.C.

(57) ABSTRACT

Techniques for generating a per-packet initialization vector for high bandwidth encryption engines in a multipathing IP network are described herein. In examples, a network switch of a first datacenter site may receive a data packet to be sent to a second datacenter site over a network. The data packet may be encrypted according to a virtual extensible LAN (VxLAN) protocol and to be transmitted in a VxLAN tunnel created for the first datacenter site and the second datacenter site. An encryption engine implemented at the network switch may generate an initialization vector (IV) for the data packet based on a packet number (PN) associated with the data packet. The encryption engine may use the IV and information associated with a security association (SA) assigned to the packet to encrypt the data packet. In some examples, a full 64-bit PN may be used to compute the IV for the data packet.

20 Claims, 6 Drawing Sheets

(56) References Cited

U.S. PATENT DOCUMENTS

| | | | |
|---|---|---|---|
| 11,943,621 B2* | 3/2024 | Xhafa | H04W 12/03 |
| 2004/0088536 A1* | 5/2004 | Lim | H04L 63/0428 |
| | | | 713/151 |
| 2005/0005093 A1* | 1/2005 | Bartels | H04L 67/34 |
| | | | 713/150 |
| 2012/0076153 A1* | 3/2012 | Manzella | H04L 49/101 |
| | | | 370/419 |
| 2014/0208132 A1* | 7/2014 | Cheston | H04L 12/12 |
| | | | 713/310 |
| 2020/0106702 A1 | 4/2020 | Acharya et al. | |
| 2020/0187010 A1* | 6/2020 | Xhafa | H04W 12/033 |
| 2020/0235914 A1 | 7/2020 | Zhang et al. | |
| 2020/0366715 A1 | 11/2020 | Chopra et al. | |
| 2021/0144075 A1 | 5/2021 | Indiresan et al. | |
| 2021/0385169 A1* | 12/2021 | Urman | H04L 1/08 |
| 2022/0393856 A1* | 12/2022 | Goel | H04L 63/164 |

OTHER PUBLICATIONS

Lackorzynski et al., "Secure and Efficient Tunneling of Macsec for Modern Industrial Use Cases", arXiv preprint arXiv:2205.12748, May 25, 2022, 10 pages.

IEEE: "IEEE Standard for Local and Metropolitan Area Networks Media Access Control (MAC) Security Amendment 2: Extended Packet Numbering", IEEE Standard, IEEE, Piscataway, NJ, USA, Feb. 12, 2013, 67 Pages, XP068045832, ISBN: 978-0-7381-8148-6, p. 20-p. 23.

International Search Report and Written Opinion for International Application No. PCT/US2023/086050, mailed Mar. 28, 2024, 16 Pages.

Wahid et al., "Secure Bridging in Large Scale Deployment of Ethernet", Proceedings of the 2010 International Conference on Security and Cryptography (SECRYPT), IEEE, Jul. 26, 2010, 11 Pages, XP031936460, figures 1, 4, p. 2-p. 6.

* cited by examiner

HIGH BANDWIDTH ENCRYPTION ENGINES IN A MULTIPATHING IP NETWORK

TECHNICAL FIELD

The present disclosure relates generally to encryption and decryption of the data packets transmitted in an inter-site tunnel in a cloud deployed datacenter network.

BACKGROUND

Traditional datacenter networks have evolved towards CLOS based network designs, which allow the datacenter networks to scale and grow incrementally on demand. A virtualized datacenter site nowadays may comprise one or more performance optimized data centers (PODs). Each POD comprises a large number of switches (e.g., approximate 500-1000 leaf switches and 8-16 spine switches) that serve the virtual networks of a tenant on a shared physical network infrastructure. To address the IP mobility, disaster recovery, scale and redundancy concerns in the datacenter network, the datacenter sites may use a virtual extensible LAN (VxLAN) tunnel to provide a high bandwidth for traffic between two sites. The traffic that traverses in the VxLAN tunnel may be encrypted for data security and integrity.

Existing encrypting solutions that use GCM-AES-XPN-128 and GCM-AES-XPN-256 may carry 32 lowest significant bits of a packet number (PN) in the encrypted data packet, even though the encryption and decryption engines, according to the standards, use a 64-bit PN number on the transmitter site and the receiver site, respectively. As the uplink bandwidth of the VxLAN tunnel is very high, the 32-bit PN used for generating the per-packet unique initialization vector (IV) for encryption may exhaust quickly, requiring a security association key (SAK) rekeying, redistribution, and re-deployment across multiple datacenter sites in very short time intervals. To overcome the fast PN exhaustion in the data plane for the high speed uplinks, the control plane may exchange the metadata in very short intervals across the multiple datacenter sites. However, it is challenging for a software based control plane to perform the very short interval rekey and key distribution. In addition, existing 64-bit PN recovery mechanisms that carry the 32 lowest significant bits of the PN in the security header is not applicable to multipathing IP networks. In a multipathing IP network, there are multiple upstream encrypting devices transmitting packets to multiple downstream decrypting devices for decryption in the VxLAN tunnel between the sites. The encrypted packets transmitted from the upstream site from one of the encrypting devices of the tunnel may land on any of the receiving decrypting devices on the downstream site, which may cause the 32 most significant bits of the PN maintained locally on the receivers become invalid. As a result, the data packet recovery may fail due to multipathing packet sprays inside the service provider IP networks connecting the VxLAN tunnel across sites.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for generating a per-packet unique initialization vector for high bandwidth encryption engines in a multipathing IP network. In examples, a tunnel, such as a VxLAN tunnel, may be created for a pair of datacenter sites for traversing the inter-site traffic. The endpoints of the VxLAN tunnel may include one or more spine switches of the datacenter sites. A transmitter endpoint of the VxLAN tunnel may receive an Ethernet frame from one of a plurality of leaf switches of the corresponding datacenter site and encapsulate the Ethernet frame to a VxLAN encapsulated packet. In examples, a security association (SA) may be generated for the VxLAN encapsulated packet to be transmitted in the VxLAN tunnel. The SA may indicate information used for encryption and decryption, such as a next packet number (PN), a security association key (SAK), a secure channel identifier (SCI), an associate number (AN), etc.

In examples, an encryption engine may be implemented by a spine switch of a datacenter site. Alternatively, or additionally, the encryption engine may be implemented by a spine switch corresponding to an endpoint of the VxLAN tunnel. The encryption engine may use a full 64-bit next PN to generate a per-packet unique initialization vector (IV) to encrypt the VxLAN encapsulated packet. The IV together with the SAK and SCI may be further used to encrypt the user data in the VxLAN encapsulated packet to obtain encrypted user data. The user data of the VxLAN encapsulated packet may include a tenant payload and a VxLAN header. In examples, the IV may be used to compute an integrity checksum value (ICV) for packet integrity check. The encryption engine may further construct a security header to include information related to encryption and transmission of the VxLAN encapsulated packet in the VxLAN tunnel, such as the next PN, the SCI and the AN. In examples, the encryption engine may further replace the user data of the VxLAN encapsulated packet with the encrypted user data and insert the ICV and the security header into the VxLAN encapsulated packet to generate an encrypted VxLAN encapsulated packet to be transmitted in the VxLAN tunnel.

Additionally, the techniques described herein may be performed as a method and/or by a system having non-transitory computer-readable media storing computer-executable instructions that, when executed by one or more processors, performs the techniques described above.

Example Embodiments

As described above, in a multi-site datacenter network, a data packet is encrypted for security and integrity before it is transmitted to a VxLAN tunnel between two datacenter sites. Due to the high speed uplinks of the VxLAN tunnel, existing encryption schemes may exhaust the PN bits when 32 bits of the next PN are used for generating the per-packet unique initialization vector (IV) for encryption. It is also challenging for the software based control plane to offset the shortage of using 32 bits of the next PN for the per-packet unique IV. Accordingly, this disclosure describes a data plane approach that uses a full 64-bit PN, as an example, to generate the per-packet IV for encrypting the data packet to be transmitted in the VxLAN tunnel.

In examples, a VxLAN tunnel may be created for a pair of datacenter sites for traversing the inter-site traffic. The network switches in the datacenter site may be organized into two or more stages, including at least the lower level stage switches (also known as leaf switches) and the higher level stage switches (also known as spine switches). Each endpoint of the VxLAN tunnel may include one or more spine switches of the datacenter site. In examples, a spine switch of a transmitter endpoint of the VxLAN tunnel may receive an Ethernet frame from a leaf switch of the corresponding datacenter site and encapsulate the Ethernet frame into a VxLAN encapsulated packet. In examples, the VxLAN encapsulated packet may include at least an Ethernet header, an IP header (VTEPs) indicating IP addresses of the VxLAN tunnel endpoints, a user datagram protocol (UDP) header, a VxLAN Header, a tenant payload, and a cyclic redundancy check (CRC).

In examples, a security association (SA) may be generated for the VxLAN encapsulated packet with a set lifetime. The SA may include the information used for encrypting and decrypting the data packet, including but not limited to, a next packet number (PN), a security association key (SAK), a secure channel identifier (SCI), an associate number (AN). The SA may be allocated and distributed to both the transmitter site and the receiver site. Information of the SA may be stored locally at the transmitter site and the receiver site for the encryption and decryption.

In examples, when an encryption engine receives a VxLAN encapsulated packet, the encryption engine may retrieve a destination IP (DIP) address from the IP header (VTEPs) of the VxLAN encapsulated packet. The encryption engine may use the DIP to search the local database at the transmitter site to obtain information of the SA assigned for the VxLAN encapsulated packet. In examples, the encryption engine may retrieve the next PN from the SA and compute the IV for the VxLAN encapsulated packet based at least in part the next PN.

The encryption engine may further use the IV together with the security association key (SAK) and the secure channel identifier (SCI) to encrypt the user data of the VxLAN encapsulated packet and generate encrypted user data. In examples, the user data of the VxLAN encapsulated packet may include the VxLAN header and the tenant payload.

In examples, the encryption engine may also generate an integrity checksum value (ICV) using the IV for integrity check purpose. In a further example, the encryption engine may further construct a security header that includes the information for encryption and decryption, such as the next PN associate with the VxLAN encapsulated packet, the security channel identifier (SCI) and the association number (AN). The encryption engine may then replace the user data of the VxLAN encapsulated packet with the encrypted user data and insert the ICV and the security header into the VxLAN encapsulated packet to generate an encrypted VxLAN encapsulated packet. The encrypted VxLAN encapsulated packet may be further transmitted to another datacenter site in the VxLAN tunnel.

In a further example, once the encrypted VxLAN encapsulated packet is sent, the next PN may be incremented by one in the transmitter site SA for further use.

In examples, the encryption engine may be implemented at a spine switch of the datacenter site. Alternatively, or additionally, the encryption engine may be implemented at a spine switch corresponding to an endpoint of the VxLAN tunnel. In examples, the encryption engine may use a full 64-bit next PN to compute the unique initialization vector (IV) for the VxLAN encapsulated packet and to encrypt the user data in the VxLAN encapsulated packet.

Comparing to the existing encryption techniques, in which 32 lowest significant bits of the next PN are used for the per-packet unique IV, this disclosure uses a 64-bit based per-packet unique IV during the lifetime of the SA for confidentiality and integrity protection and does not suffer from the extra-short interval rekey requirements on the PN exhaustion.

In examples, when a decryption engine receives an encrypted VxLAN encapsulated packet from the VxLAN tunnel, the decryption engine may retrieve a source IP (SIP) address from the IP header (VTEPs). The decryption engine may further obtain the information used for encryption from the security header, such as the SCI and the AN. The decryption engine may then use the SCI and the AN together with the SIP address to search the local database to obtain the information of SA locally stored at the receiver site. In examples, the decryption engine may retrieve the copy of a security association key (SAK) from the SA stored at the receiver site.

As described herein, the security header of the encrypted VxLAN encapsulated packet carries the 64-bit next PN as-is, and the decrypt engine may retrieve the next PN directly from the security header of the encrypted VxLAN encapsulated packet and use it as is for the per-packet unique IV. The decrypt engine may regenerate the integrity checksum value (ICV) using the next PN carried by the security header, i.e., the per-packet unique IV, the SCI, the SAK, and the encrypted user data.

In examples, the decrypt engine may validate the integrity of the encrypted VxLAN encapsulated packet based on the regenerated ICV. Once the ICV validation passes, the decrypt engine may decrypt the encrypted user data in the encrypted VxLAN encapsulated packet using the next PN, the security association key (SAK) and the SCI. The decrypt engine may further remove the security header and the ICV from the encrypted VxLAN encapsulated packet to recover the original VxLAN encapsulated packet. The original VxLAN encapsulated packet may then be transmitted to the downstream device, such as a leaf switch in the datacenter site.

In a further example, once the original VxLAN encapsulated packet is successfully recovered and sent to the downstream device, the next PN in the receiver site SA may be set according to the next PN carried by the security header for future use.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
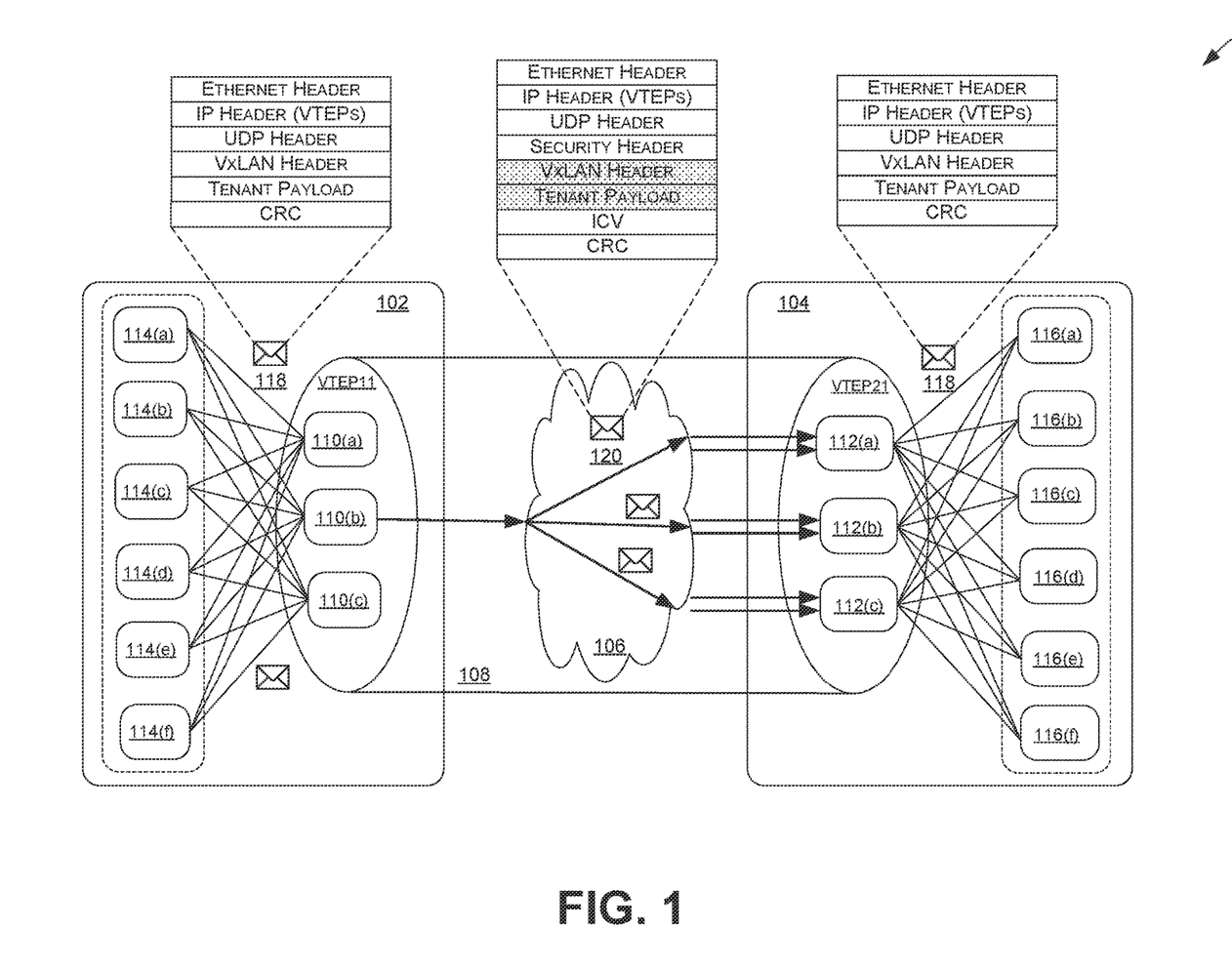
FIG. 1 illustrates a system-architecture diagram of an example multipathing IP network data-plane that includes a tunnel, such as a VxLAN tunnel, created for two datacenter sites.

FIG. 1 illustrates a system-architecture diagram of an example multipathing IP network data-plane 100, which includes a tunnel to transmit the TCP or UPD packets that are encrypted using the cryptographic machinery of IEEE MACsec. In examples, the tunnel may include a VxLAN tunnel, iVxLAN tunnel, or VxLAN-GPE tunnel, etc. As shown in FIG. 1, a VxLAN tunnel 108 is created to transmit traffic between a datacenter site 102 and a datacenter site 104 over a network 106.

In examples, the datacenter site 102 and the datacenter site 104 may refer to any virtualized datacenter site in a datacenter network. The datacenter network may generally implement CLOS based network designs in which the switches in a datacenter site may be organized into two or more stages. In a two-stage design, the lower level stage switches (i.e., leaf switches) may provide the network connectivity to the end hosts (e.g., endpoints or virtual machines) and implement the layer-2 bridging and the layer-3 routing functions. The higher level stage switches (i.e., spine switches) may provide the redundant paths and the network connectivity to a previous lower level stage switch in the network fabric.

As shown, the datacenter site 102 may comprise a plurality of leaf switches 114(a)-114(f) that connect to the endpoint devices (not shown in FIG. 1) and provide the layer-2 bridging and the layer-3 routing to the endpoint devices. The datacenter site 102 may further comprise a plurality of spine switches 110(a)-110(c) that connect to the leaf switches 114(a)-114(f) in the datacenter site 102 and provide the multipath communications to another site (e.g., the datacenter site 104) in the datacenter network. Similarly, the datacenter site 104 may comprise a plurality of leaf switches 116(a)-116(f) and a plurality of spine switches 112(a)-112(c).

In examples, the datacenter site 102 and the datacenter site 104 may be connected using data center interconnect (DCI) strategies, such as a virtual extensible LAN (VxLAN) that uses a site-to-site VxLAN overlay IP tunnel over the Internet or WAN to send the data traffic between the two sites. The endpoints of the VxLAN tunnel may comprise one or more spine switches that share an IP address in the uplinks. For instance, one endpoint of the VxLAN tunnel 108 comprises the spine switches 110(a)-110(c) that share the IP address VTEP11 in the uplinks while another endpoint of the VxLAN tunnel 108 comprises the spine switches 112(a)-112(c) that share the IP address VTEP 21 in the uplinks. The IP traffic may flow inside the VxLAN tunnel 108, egressing from an uplink of one of the spine switches 110(a)-110(c) on the datacenter site 102, and ingressing to any uplinks of the spine switches 112(a)-112(c) on the datacenter site 104.

In examples, a layer-2 frame from a leaf switch may be encapsulated according to the VxLAN protocol at a spine switch to generate a layer-3 packet, e.g., the VxLAN encapsulated packet 118. As shown, the VxLAN encapsulated packet 118 may include a tenant payload (e.g., the payload of the layer-2 frame) encapsulated in a VxLAN header. The tenant payload together with the VxLAN header may form a user datagram protocol (UDP) payload. A UDP header may be added to the UDP payload to form a UDP-IP packet (i.e., the layer-3 packet). The UDP-IP packet may be further attached to an IP header (VTEPs) and an Ethernet header. In examples, the IP header (VTEPs) may indicate the information related to the VxLAN tunnel end points. In a further example, the VxLAN encapsulated packet 118 may further include a cyclic redundancy check (CRC) originally carried by the layer-2 frame.

In examples, to mitigate the security threats on data confidentiality and integrity for the inter-site traffic flows, various encryption schemes may be used to secure the traffic that traverses inside the VxLAN tunnel 108. The encryption schemes may generally utilize the allocation and distribution of the cryptography symmetric keys and set up of two unidirectional security associations (SAs) between the datacenter site 102 and the datacenter site 104 to secure the inter-site VxLAN overlay traffic. For instance, at the datacenter site 102 (Tx site), an encryption engine may encrypt the VxLAN encapsulated packet 118 to generate an encrypted VxLAN encapsulated packet 120 to be sent to the datacenter site 104 (Rx site) in the VxLAN tunnel 108. In examples, the encryption engine may be implemented at one of the spine switches 110(a)-110(c) at the Tx site of the VxLAN tunnel 108.

In examples, the encryption engine may encrypt the tenant payload together with the VxLAN header of the VxLAN encapsulated packet 108 using at least a security association key (SA) and a per-packet unique initialization vector (IV) to generate encrypted user data. In examples, the encrypt engine may further construct a security header to include the information for encryption and decryption. The security header may be included in the encrypted VxLAN encapsulated packet 120. In examples, the encrypted VxLAN encapsulated packet 120 may further include an integrity checksum value (ICV) to validate the integrity of the encrypted VxLAN encapsulated packet 120 received at the Rx site of the VxLAN tunnel 108. In examples, the encryption of the tenant payload and the VxLAN header, and the computing of the IV may use a full 64-bit next packet number (PN) associated with the VxLAN encapsulated packet 118.

In examples, at the Rx site of the VxLAN tunnel 108, a decryption engine may validate the integrity of the encrypted VxLAN encapsulated packet 120 based on the ICV. Upon determining that the integrity of the encrypted VxLAN encapsulated packet 120 is valid, the decryption engine may decrypt the encrypted VxLAN encapsulated packet 120 to recover the VxLAN encapsulated packet 108. In examples, the decryption engine may be implemented at the Rx site of the VxLAN tunnel 108.

In examples, the network 106 may facilitate communications of information or data between any datacenter cites, such as the datacenter site 102 and the datacenter site 104. In examples, the network 106 may include one or more networks implemented by any viable communication technology, such as wired and/or wireless modalities and/or technologies. The network(s) 106 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

Figure 2:
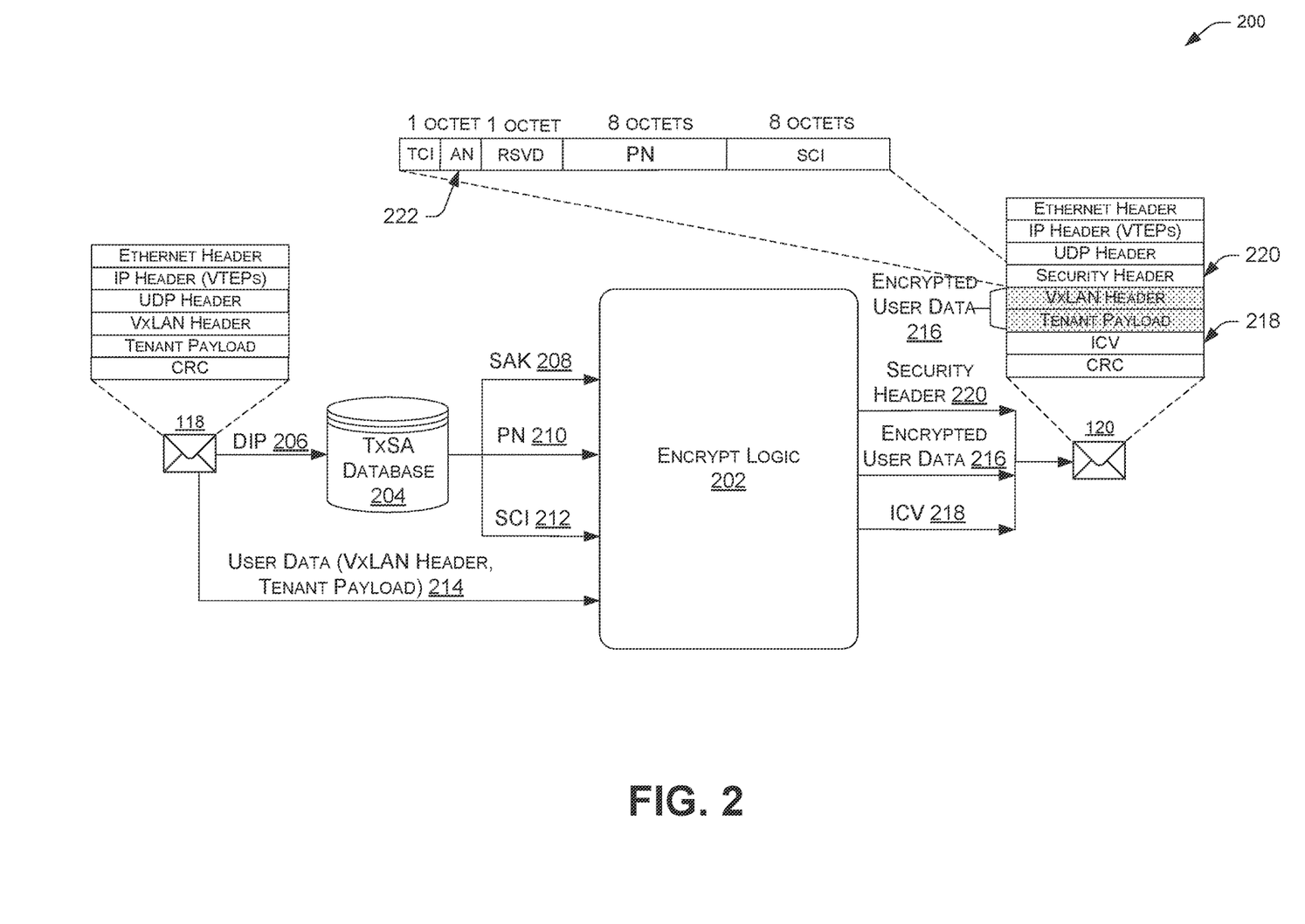
FIG. 2 illustrates a block diagram of an example encryption engine configured to encrypt the data packet transmitted in the example VxLAN tunnel.

FIG. 2 illustrates a block diagram of an example encryption engine configured to encrypt the data packet transmitted in the example VxLAN tunnel.

In examples, the encryption engine 200 may include encrypt logic 202 communicatively coupled to a TxSA database 204. As described herein, when the VxLAN tunnel 108 is established between the pair of datacenter sites (e.g., datacenter site 102 and datacenter site 104), a security association (SA) between the pair of the datacenter sites may be set up for a lifetime period. Information of the SA may be stored locally on the pair of the datacenter sites. For instance, the TxSA database 204, as a Tx site database, may store a copy of the SA for encrypting the data packets to be transmitted in the VxLAN tunnel 108.

In examples, the SA may define one or more parameters for encrypting and decrypting the data packets transmitted between the datacenter site 102 and the datacenter site 104 in the VxLAN tunnel 108. By way of example and without limitation, the one or more parameters of the SA may include a security association key (SAK), a next packet number (PN), a secure channel identifier (SCI), an association number (AN), etc. The SAK may include the attributes, such as the cryptographic algorithm or the traffic encryption key that is used to secure the traffic in the VxLAN tunnel 108. The next PN may be a sequence number assigned by the transmission site (e.g., the datacenter site 102) to each data packet to be sent to the receiver site (e.g., the datacenter site 104) in the VxLAN tunnel 108. The SCI may be a unidirectional secure identifier that is used to transmit the secure data between the datacenter site 102 and the datacenter site 104. The AN may be an identifier of the SA within the VxLAN tunnel 108. In examples, a combination of the SCI and the AN may identify the SAK used between the datacenter site 102 and the datacenter site 104.

In examples, when the VxLAN encapsulated packet 118 is received at an endpoint of the VxLAN tunnel 108, e.g., one of the spine switches 112(a)-112(c), the encrypt logic 202 may retrieve a destination IP (DIP) address 206 from the IP header (VTEPs) of the VxLAN encapsulated packet 118. The encrypt logic 202 may search the TxSA database 204 using the DIP 206 and obtain the information of the SA assigned to the VxLAN encapsulated packet 118, for instance, the SAK 208, the next packet number (PN) 210, and the SCI 212. The encrypt logic 202 may determine the per-packet unique initialization vector (IV) for the VxLAN encapsulated packet 108 based on the PN 210. The encrypt logic 202 may further encrypt the user data 214 (e.g., the tenant payload and the VxLAN header) based at least in part on the IV, the SAK 208, and the SCI 212 to generate the encrypted user data 216.

In examples, the encrypt logic 202 may generate an integrity checksum value (ICV) 218 based at least in part on the IV for checking the integrity of the packet after the packet is transmitted through the VxLAN tunnel. In examples, the ICV 218 may be generated using any cryptographic algorithms, including but not limited to, the message digital algorithm 5 (MD5), the secure hash algorithm (SHA), such as SHA-1, SHA-256, SHA-512, etc.

In examples, the encrypt logic 202 may further construct a security header 220 to include the information used for encryption and decryption, such as the next PN 210, the SCI 212 and the AN 222. As shown in FIG. 2, the security header 220 may include a tag control information (TCI) and AN field in 1 octet, a reserved (RSVD) field in 1 octet, a PN field in 8 octets, and an SCI field in 8 octets.

In examples, the encrypt logic 202 may replace the user data 214 in the VxLAN encapsulated packet 118 (e.g., the tenant payload and the VxLAN header) with the encrypted user data 216 and insert the security header 220 and the ICV 218 to the VxLAN encapsulated packet 118 to generate the encrypted VxLAN encapsulated packet 120. In examples, the security header 220 may be inserted between the UDP header and the VxLAN header of the VxLAN encapsulated packet 118 and the ICV 218 may be inserted between the tenant payload and the CRC of the VxLAN encapsulated packet 118.

Figure 3:
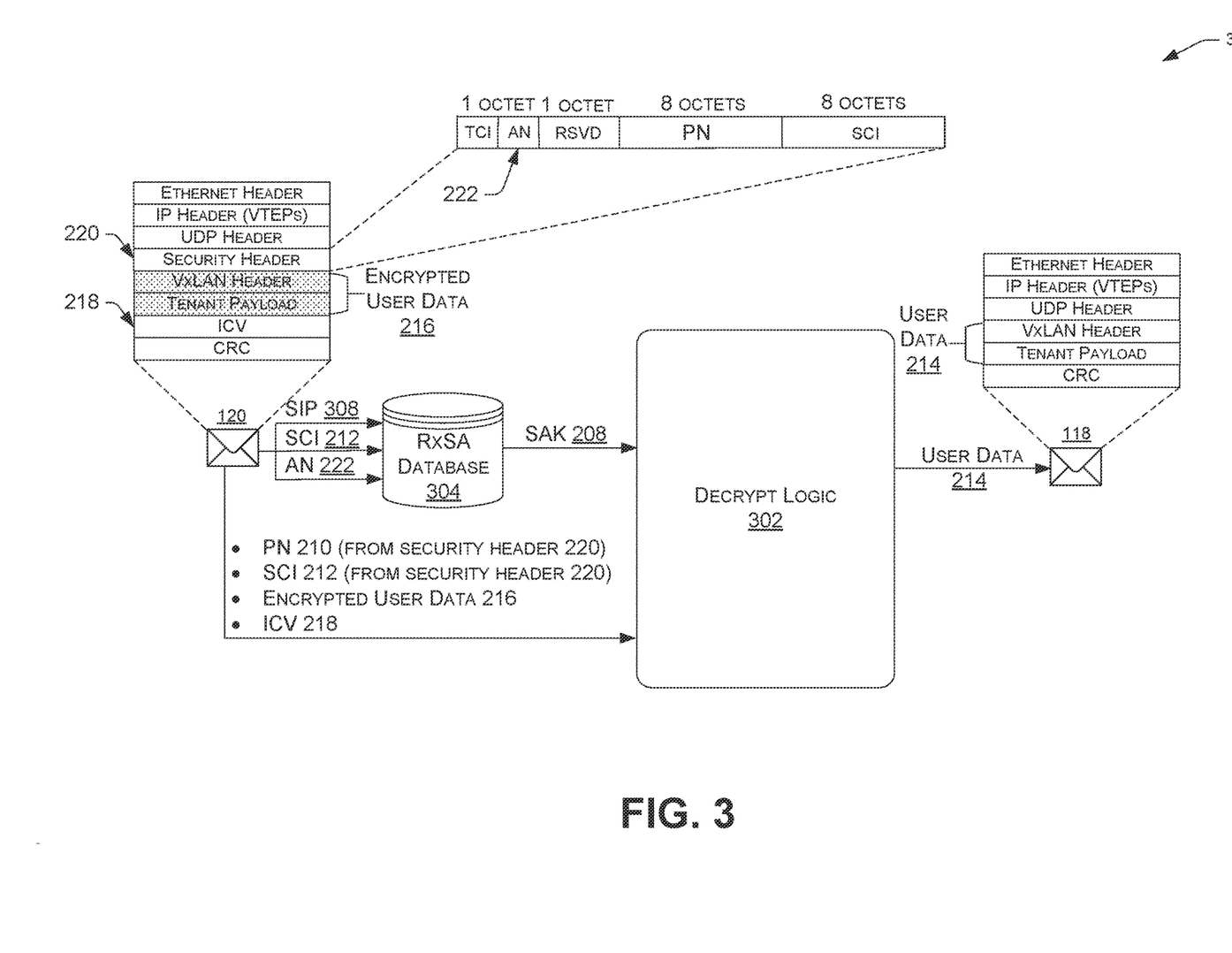
FIG. 3 illustrates a block diagram of an example decryption engine configured to decrypt the data packet transmitted in the example VxLAN tunnel.

FIG. 3 illustrates a block diagram of an example decryption engine configured to decrypt the data packet transmitted in the example VxLAN tunnel.

In examples, the decryption engine 300 may include decrypt logic 302 communicatively coupled to a RxSA database 304. As described herein, the information of the security association (SA) created for the communication between the datacenter sites (i.e., the datacenter site 102 and datacenter site 104) in the VxLAN tunnel 108 is not only stored in the transmission site TxSA database 204 but also in the receiver site RxSA database 304.

In examples, when the encrypted VxLAN encapsulated packet 120 is received at the receiver site (e.g., the datacenter site 104), the decrypt logic 302 may retrieve the next packet number (PN) 210 from the security header 220 of the encrypted VxLAN encapsulated packet 120 and use the next PN 210 as is for the per-packet unique IV. The decrypt logic 302 may retrieve a source IP (SIP) address 308 from the IP header (VTEPs) of the encrypted VxLAN encapsulated packet 120. The decrypt logic 302 may further retrieve the SCI 212 and AN 222 from the security header 220 of the encrypted VxLAN encapsulated packet 120. The decrypt logic 302 may then search the RxSA database 304 using the SIP 308, the SCI 212, and the AN 222 and obtain the security association key (SAK) 208 used for regenerating the ICV and the decryption. The decrypt logic 302 may then regenerate the ICV based at least in part on the IV (i.e., the next PN 210), the SAK 208, the SCI 212, and the encrypted user data 216. The decrypt logic 302 may compare the regenerated ICV with the ICV 218 carried by the encrypted VxLAN encapsulated packet 120. If the regenerated ICV does not match the ICV 218 carried by the encrypted VxLAN encapsulated packet 120, the decrypt logic 302 may determine that the integrity check of the encrypted VxLAN encapsulated packet 120 fails and drop the encrypted VxLAN encapsulated packet 120.

In examples, if the regenerated ICV matches the ICV 218 carried by the encrypted VxLAN encapsulated packet 120, the decrypt logic 302 may determine that the encrypted VxLAN encapsulated packet 120 passes the integrity check. The decrypt logic 302 may decrypt the encrypted user data 216 in the encrypted VxLAN encapsulated packet 120 using the IV (i.e., the next PN 210), the SAK 208, and the SCI 212 to recover the user data 214 (e.g., the tenant payload and the VxLAN header originally carried by the VxLAN encapsulated packet 118). In examples, the decrypt logic 320 may further remove the security header 220 and the ICV 218 from the encrypted VxLAN encapsulated packet 120 to recover the original VxLAN encapsulated data packet 118 and transmit the VxLAN encapsulated data packet 118 to the destination device.

Figure 4A:
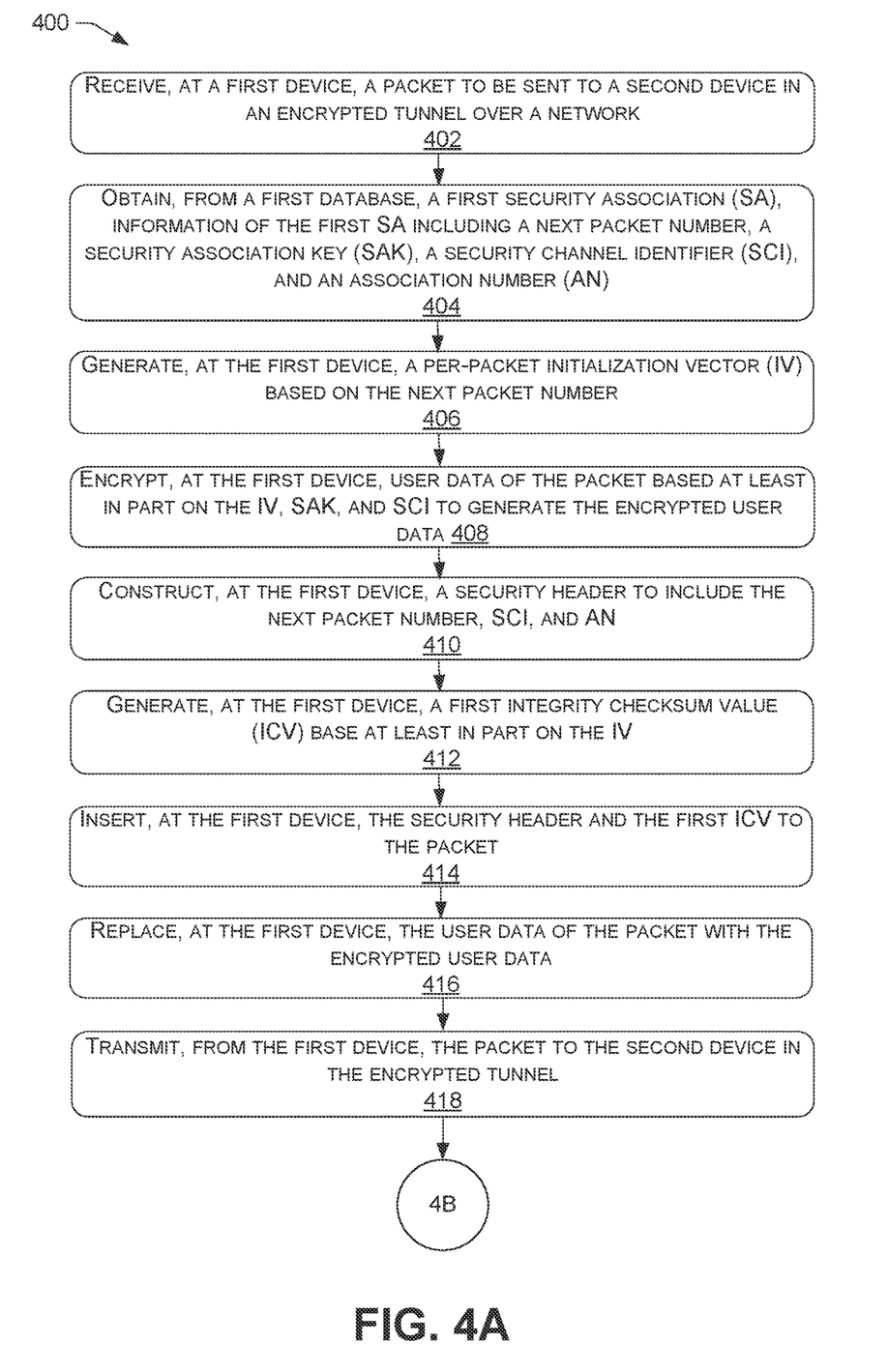
FIGS. 4A and 4B illustrate a flow diagram of an example method for encrypting and decrypting the data packet transmitted in the example VxLAN tunnel.
Figure 4B:
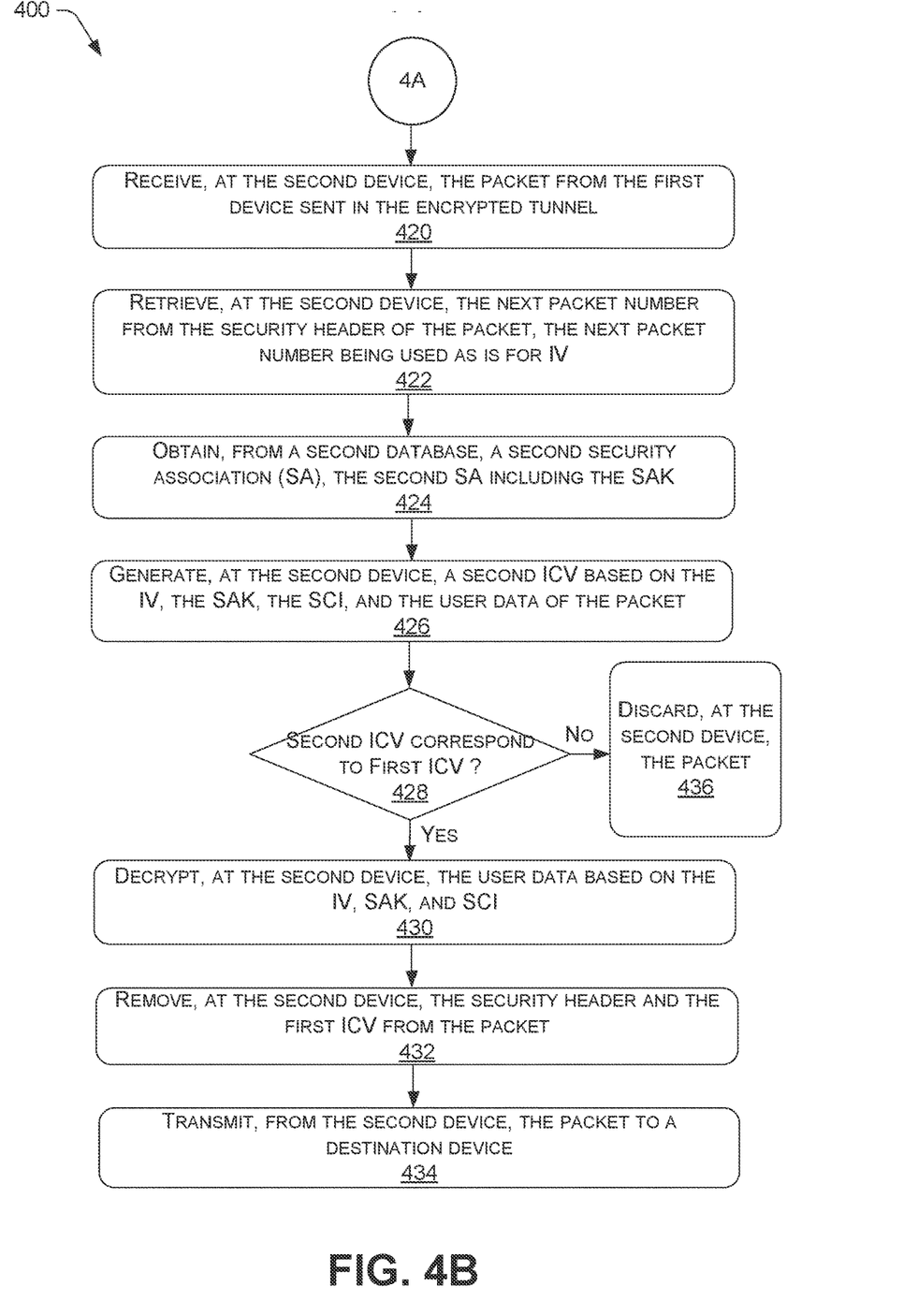

FIGS. 4A and 4B illustrate a flow diagram of an example method for encrypting and decrypting the data packet transmitted in the example VxLAN tunnel.

Although FIGS. 4A and 4B illustrate these processes in a step-by-step order, and although these figures will be explained in a step-by-step order as well, any of the steps of these example processes may be performed independently of other steps, in any order, and/or in parallel with other steps. Additionally, steps may be omitted from the example processes and/or replaced with other steps described herein.

At block 402, the process begins by receiving, at a first device, a packet to be sent to a second device in an encrypted tunnel over a network. In examples, the first device and the second device may include one or more datacenter sites or virtualized datacenter sites in a cloud deployed datacenter network. The encrypted tunnel may implement a VxLAN protocol that facilitates the datacenter connectivity using tunneling to stretch the layer-2 connections over an underlying layer-3 network. Each of the first device and the second device may include a plurality of leaf switches and spine switches. In examples, the endpoints of the encrypted tunnel may include a plurality of spine switches that connect to the downstream leaf switches in their respective datacenter sites. In examples, a layer-2 frame may be encapsulated according to a VxLAN protocol to be transmitted in the VxLAN tunnel.

At block 404, the process includes obtaining, from a first database, a first security association (SA), information of the first SA including a next packet number (PN), a security association key (SAK), a security channel identifier (SCI), and an association number (AN). In examples, a security association (SA) may be created for the first device and the second device for transmitting traffic in the encrypted tunnel with a lifetime period. The information of the SA may be symmetrically stored at the local databases associated with the first device and the second device, respectively. For instance, the first SA may be a copy of the SA stored in the transmission site database. In examples, the first device may retrieve a destination IP (DIP) address from an IP header (VTEPs) of the VxLAN encapsulated packet and search the first database using the DIP address to obtain the first SA.

At block 406, the process includes generating, at the first device, a per-packet initialization vector (IV) based on the next packet number (PN). In examples, the per-packet IV may be a unique random or pseudorandom number computed using the next PN. In a further example, the first device may use the full 64-bit next PN as is to generate the per-packet IV for the VxLAN encapsulated packet. As discussed herein, the next PN may indicate a next packet number maintained in the hardware of the first device.

At block 408, the process includes encrypting, at the first device, user data of the packet based at least in part on the IV, the SAK, and the SCI to generate the encrypted user data. In examples, the user data of the VxLAN encapsulated packet may generally include a tenant payload and a VxLAN header. The first device may encrypt the tenant payload together with the VxLAN header using the IV, the SAK, and the SCI to generate an encrypted user data.

At block 410, the process includes constructing, at the first device, a security header to include the next packet number (PN), the SCI and the AN. In examples, the security header may be constructed to leverage the cryptographic machinery of IEEE MACsec for the VxLAN encapsulated packet transmitted in the VxLAN tunnel. In a further example, the security header may include a complete sequence of the 64-bit PN instead of the 32 lowest significant bits of the next PN.

At block 412, the process includes generating, at the first device, a first integrity checksum value (ICV) based at least in part on the IV. In examples, the first ICV may be generated using any cryptographic algorithms, including but not limited to, the message digital algorithm 5 (MD5), the secure hash algorithm (SHA), such as SHA-1, SHA-256, SHA-512, etc.

At block 414, the process includes inserting, at the first device, the security header and the first ICV to the packet. In examples, the security header may be inserted between the UDP header and the VxLAN header of the VxLAN encapsulated packet. In a further example, the first ICV may be inserted between the CRC and the tenant payload of the VxLAN encapsulated packet.

At block 416, the process includes replacing the user data of the packet with the encrypted user data. As discussed herein, the tenant payload together with the VxLAN header are replaced with the encrypted tenant payload and the encrypted VxLAN header.

At block 418, the process includes transmitting, from the first device, the packet to the second device in the encrypted tunnel. As discussed herein, the packet may include the Ethernet header, the IP header (VTEPs), the UDP header, the security header, the encrypted VxLAN header, the encrypted tenant payload, the first ICV, and the CRC.

In further examples, the first device may increment the next PN value by one and store the next PN in the first SA for future use.

At block 420, the process includes receiving, at the second device, the packet from the first device sent in the encrypted tunnel. As discussed herein, the packet may be encapsulated according to the VxLAN protocol and further encrypted based at least in part on the per-packet unique IV and the SAK.

At block 422, the process includes retrieving, at the second device, the next packet number from the security header of the packet, the next packet number being used as is for IV. As described herein, the security header may carry the full 64-bit next PN as is. Thus, a full 64-bit next packet number may be directly retrieved from the security header of the encrypted VxLAN encapsulated packet and used as the per-packet unique IV.

At block 424, the process includes obtaining, from a second database, a second security association (SA), the second SA including the SAK. In examples, the encryption engine at the first device and the decryption engine at the second device may use a symmetric SAK for packet encryption and decryption. The second SA may include the symmetric SAK to decrypt the encrypted VxLAN encapsulated packet.

At block 426, the process includes generating, at the second device, a second ICV based on the IV, the SAK, the SCI, and the user data of the packet. In examples, the decryption engine at the second device may retrieve the SCI from the security header of the packet. In examples, the decryption engine at the second device may generate the second ICV based at least in part on the IV, e.g., the full 64-bit next packet number carried in the security header of the encrypted VxLAN encapsulated packet, the SCI, the SAK, and the user data of the encrypted VxLAN encapsulated packet.

At block 428, the process includes determining whether the second ICV corresponds to the first ICV carried in the received packet.

When the second ICV corresponds to the first ICV carried in the packet, at block 430, the process includes decrypting, at the second device, the user data of the packet based on the IV, the SAK, and the SCI. In examples, the decryption engine at the second device may retrieve the SAK from a second database (i.e., a local database) and retrieve the information of the next PN and the SCI from the security header and use the SAK, the next PN, and the SCI to decrypt the user data, e.g., the tenant payload and the VxLAN header.

At block 432, the process includes removing, at the second device, the security header and first ICV from the received packet. Once the integrity check passes and the user data is successfully decrypted, the security header and the first ICV may be removed from the encrypted VxLAN encapsulated packet, thus recovering the originally VxLAN encapsulated packet received at the first device.

At block 434, the process includes transmitting, from the second device, the packet to a destination device. In examples, the packet may be routed to the destination device based at least in part on the destination IP address and information included in the Ethernet header of the VxLAN encapsulated packet.

When the second ICV does not correspond to the first ICV carried in the packet, at block 436, the process includes discarding, at the second device, the packet. In examples, the process may further include performing the CRC check for the received packet. When the ICV and/or the CRC check fail, the received packet may be dropped by the second device.

In examples, the decryption engine may set the next PN at the second device according to the next PN in the security header of the encrypted VxLAN encapsulated packet and store the next PN in the second database for future use.

Figure 5:
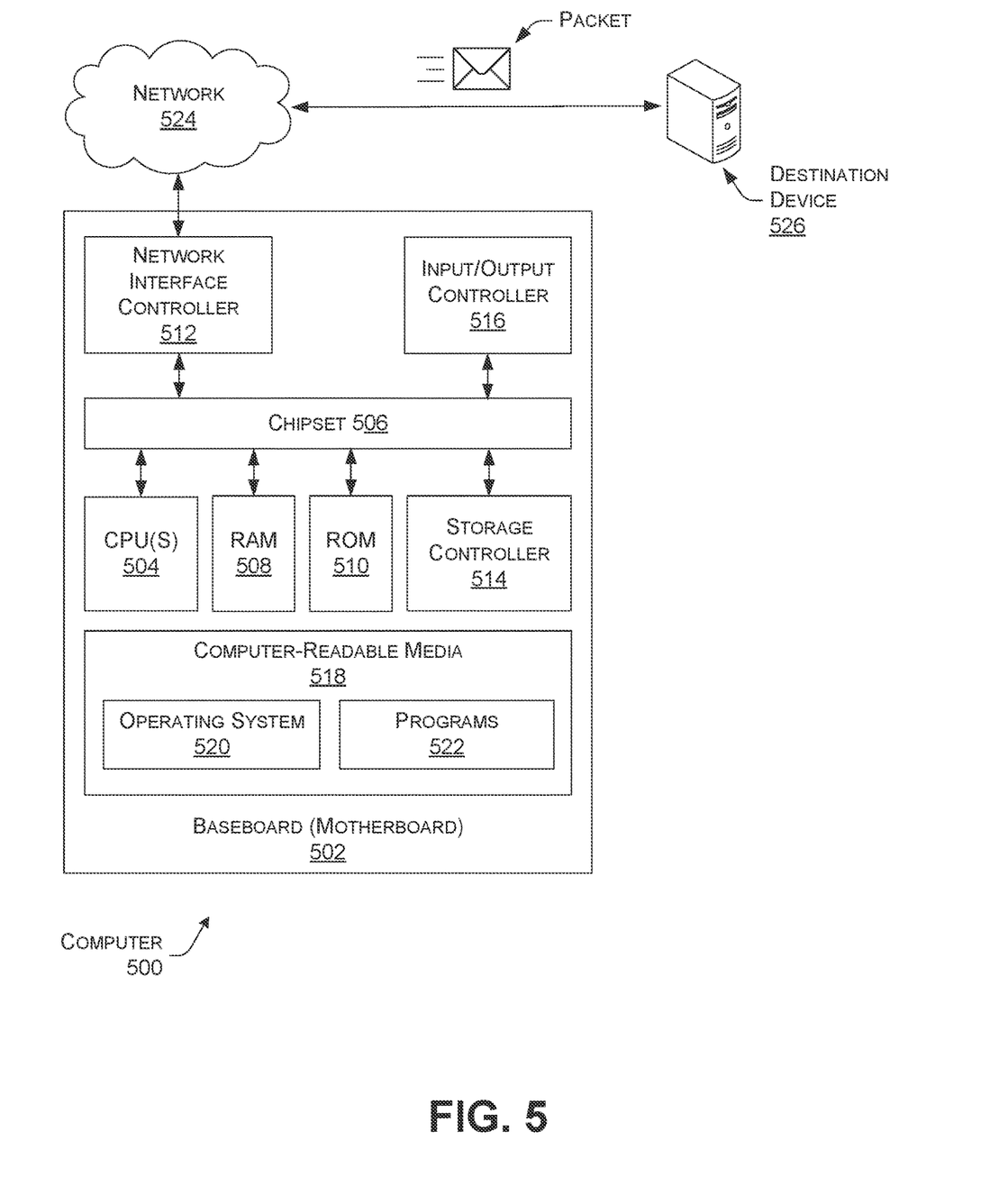
FIG. 5 illustrates a computer architecture diagram showing an illustrative computer hardware architecture for implementing a network device that can be utilized to implement aspects of the various technologies presented herein.

FIG. 5 is a computer architecture diagram showing an illustrative computer hardware architecture for implementing a network device that can be utilized to implement aspects of the various technologies presented herein. The computer architecture shown in FIG. 5 illustrates a conventional server computer, network device, router, switch, gateway, workstation, desktop computer, laptop, tablet, network appliance, e-reader, smartphone, or other computing device, and can be utilized to execute any of the software components presented herein. Additionally, or alternatively, the computer 500 may, in some examples, correspond to a switch of a virtualized datacenter site, such as the spine switch 110(*a*)-110(*c*) and 112(*a*)-112(*c*) and the leaf switches 114(*a*)-114(*f*) and 116(*a*)-116(*f*), as described herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 524. The chipset 506 can include functionality for providing network connectivity through a NIC 512, such as a gigabit Ethernet adapter. The NIC 512 is capable of connecting the computer 500 to other computing devices over the network 524, such as the destination device 526. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the network 524 and or any components included therein, may be supported by one or more devices similar to computer 500. Stated otherwise, some or all of the operations performed by the network 524, and or any components included therein, may be performed by one or more computer devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The programs 522 may comprise any type of programs or processes to perform the techniques described in this disclosure for a data plane approach for per-packet unique initialization vector (IV) for high bandwidth encryption engines in multipathing IP network. The programs 522 may enable the computer 500 to perform various operations described above with regard to FIGS. 3-4.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, at a first device, a packet to be sent, over a network and in an encrypted tunnel, to a second device;
   generating, at the first device, an initialization vector (IV) for the packet based at least in part on a packet number (PN) associated with the packet;
   constructing, at the first device, a security header based at least in part on the PN;
   encrypting, at the first device, the packet based at least in part on the IV and information associated with a security association (SA) assigned to the packet to generate an encrypted packet, including:
   replacing, at the first device, user data in the packet with encrypted user data,
   inserting, at the first device, an integrity checksum value (ICV) into the packet, and
   inserting, at the first device, the security header into the packet; and
   transmitting, from the first device, the encrypted packet to the second device in the encrypted tunnel over the network.

2. The method of claim 1, wherein the PN is represented in a length of 64 bits, and the method further comprises:
   generating, at the first device, the IV for the packet using the 64 bits.

3. The method of claim 1, further comprising:
   obtaining, from a database, the SA assigned to the packet, wherein the information associated with the SA includes the PN, a security association key (SAK), a security channel identifier (SCI), and an association number (AN).

4. The method of claim 3, further comprising:
   constructing, at the first device, the security header to include at least the PN, the SCI and the AN.

5. The method of claim 1, further comprising:
   generating, at the first device, the ICV based on the IV.

6. The method of claim 3, further comprising:
   encrypting, at the first device, the user data of the packet based at least in part on the IV, the SAK, and the SCI to generate the encrypted user data.

7. The method of claim 1, further comprising:
   incrementing, at the first device, the PN by one to generate a second PN; and
   updating, at the first device, the SA to include the second PN.

8. The method of claim 1, wherein the packet is encapsulated using a virtual extensible local area network (VxLAN) overlay protocol.

9. A first device comprising:
   a processor; and
   a non-transitory computer-readable media storing instructions that, when executed by the processor, cause the processor to perform operations including:
   receiving a packet to be sent, over a network and in an encrypted tunnel, to a second device;

generating an initialization vector (IV) for the packet based at least in part on a packet number (PN) associated with the packet;

constructing a security header to include at least the PN;

encrypting the packet based at least in part on the IV and information associated with a security association (SA) assigned to the packet to generate an encrypted packet, including:

replacing user data in the packet with encrypted user data, inserting an integrity checksum value (ICV) into the packet, and inserting the security header into the packet; and transmitting, over the network and in the encrypted tunnel, the encrypted packet to the second device.

10. The first device of claim 9, wherein the PN is represented in a length of 64 bits, and the operations further comprise:

generating the IV for the packet using the 64 bits.

11. The first device of claim 9, wherein the operations further comprise:

obtaining, from a database, the SA assigned to the packet, wherein the information associated with the SA includes the PN, a security association key (SAK), a security channel identifier (SCI), and an association number (AN).

12. The first device of claim 11, wherein the operations further comprise:

constructing the security header to further include at least the SCI and the AN.

13. The first device of claim 9, wherein the operations further comprise:

generating the ICV based at least in part on the IV.

14. The first device of claim 11, wherein the encrypting comprises:

encrypting, at the first device, the user data of the packet based at least in part on the IV, the SAK, and the SCI to generate the encrypted user data.

15. The first device of claim 9, wherein the operations further comprise:

incrementing the PN by one to generate a second PN; and updating the SA to include the second PN.

16. The first device of claim 9, the packet is encapsulated using a virtual extensible local area network (VxLAN) overlay protocol.

17. A second device comprising:

a processor; and a non-transitory computer-readable media storing instructions that, when executed by the processor, cause the processor to perform operations including:

receiving, over a network and via an encrypted tunnel, a packet from a first device;

retrieving a packet number (PN) associated with the packet from a security header of the packet;

generating a first integrity checksum value (ICV) based at least in part on the PN;

performing an integrity check for the packet by comparing the first ICV with a second ICV in the packet;

in response to the packet passing the integrity check, decrypting the packet based at least in part on information associated with a security association (SA) assigned to the packet to generate a decrypted packet, including:

replacing user data in the packet with decrypted user data, and removing the security header and the second ICV from the packet; and transmitting, over the network, the decrypted packet to a destination device.

18. The second device of claim 17, wherein the PN is in a length of 64 bits, and the operations further comprise:

using the PN as is for an initialization vector (IV) for the packet;

obtaining, from the database, the SA assigned to the packet, wherein the information associated with the SA includes at least a security association key (SAK);

retrieving a security channel identifier (SCI) from the security header; and generating the first ICV based at least in part on the IV, the SAK, the SCI, and user data of the packet.

19. The second device of claim 18, wherein the decrypting comprises:

decrypting the user data of the packet based at least in part on the IV, the SAK, and the SCI.

20. The second device of claim 17, wherein the encrypted tunnel is a virtual extensible local area network (VxLAN) tunnel.

* * * * *